United States Patent [19]

Peters

[11] Patent Number: 5,542,068

[45] Date of Patent: Jul. 30, 1996

[54] METHOD AND SYSTEM FOR STORING FLOATING POINT NUMBERS TO REDUCE STORAGE SPACE

[75] Inventor: Chris Peters, Bellevue, Wash.

[73] Assignee: Microsoft Corporation, Redmond, Wash.

[21] Appl. No.: 804,425

[22] Filed: Dec. 10, 1991

[51] Int. Cl.[6] ........................................... G06F 5/00
[52] U.S. Cl. .................. 395/500; 364/239.3; 364/239; 364/259.3; 364/DIG. 1
[58] Field of Search .............. 395/500; 364/715.01, 364/715.03, 748, 745, 715.02

[56] References Cited

U.S. PATENT DOCUMENTS

| | | | |
|---|---|---|---|
| 3,656,178 | 4/1972 | De Maine | 364/748 |
| 3,766,370 | 10/1973 | Walther | 235/156 |
| 3,835,456 | 9/1974 | Angelle | 364/715.02 |
| 3,872,442 | 3/1975 | Boles | 395/375 |
| 4,528,640 | 7/1985 | Criswell | 364/748 |
| 4,740,993 | 4/1988 | Skubnik | 375/30 |
| 4,805,128 | 2/1989 | Nelsen | 364/715.03 |
| 4,847,802 | 7/1989 | Ashton | 364/748 |
| 5,179,680 | 1/1993 | Colwell | 395/425 |
| 5,317,526 | 5/1994 | Urano | 364/715.03 |
| 5,349,545 | 9/1994 | Keith | 364/715.02 |

*Primary Examiner*—Eric Coleman
*Attorney, Agent, or Firm*—Seed and Berry LLP

[57] ABSTRACT

A method for storing standard IEEE floating point numbers in either a first or a second encoded format. In the first encoded format, the number has an 11-bit exponent, an 18-bit mantissa, a sign bit, and a two-bit identifier that identifies the manner that the IEEE number was encoded. In the second format, the number is stored as a 30-bit integer having a two-bit identifier.

20 Claims, 2 Drawing Sheets

IEEE NUMBER

RK TYPE 0 & 1

RK TYPE 2 & 3

METHOD AND SYSTEM FOR STORING FLOATING POINT NUMBERS TO REDUCE STORAGE SPACE

TECHNICAL FIELD

The present invention is directed toward a method for storing numbers in computer memory and, more particularly, an improved method for storing floating point decimal numbers to reduce the necessary storage space.

BACKGROUND OF THE INVENTION

Within computer operations, and particularly in the development of software for use with personal computers (PCs), it is desirable to provide standards to facilitate portability of the software from one computer system to another. The promotion of standards also encourages the development of high quality numerical software. This is particularly important in the microprocessor and small machine environment, such as the PC environment, where individual manufacturers are not likely to develop extensive, generally usable numerical routines.

One standard format particularly used for storing floating point numbers is that developed by the Computer Society of the Institute of Electrical and Electronics Engineers (IEEE) for storing 64-bit floating point numbers. In accordance with the IEEE standard, a first bit is provided to represent the sign bit, the next 11 bits are provided to represent the exponent of the floating point number, and the remaining 52 bits are provided to represent the mantissa (FIG. 1). As is known in the art, the IEEE standard is ideal for representing floating point numbers for use in basic arithmetic operations as well as in scientific arithmetic operations. The IEEE standard has been widely adopted by software developers and manufacturers, particularly those developers and manufacturers of software for the personal computing environment.

However, many users of such software, and several applications in which the standard is employed, do not require the full capability provided by the IEEE standard. As an example, many users of spreadsheets that typically employ the IEEE standard desire to express numbers in terms of simply a dollar amount or a percentage. For these users, storing of a number having an eleven digit exponent is unnecessary. Many other users of software that employ the IEEE standard only have a need for storing small numbers, such as three- or four-digit numbers, that can be stored without using the full 52-bit mantissa provided by the standard. For each of these users, and many others, the IEEE standard represents a tremendous storage overhead, depriving them of memory space that could be used for other operations.

Accordingly, it is desirable to provide a method for storing floating point numbers, which method minimizes the amount of memory needed for storage of the number. Further, it is desirable to provide a method for storing numbers presented in the standard IEEE format wherein the numbers can be readily returned to the IEEE format for later use.

SUMMARY OF THE INVENTION

The present invention provides a method for storing numbers in computer memory. In accordance with a preferred method of the subject invention, a floating point representation of the number is obtained wherein a first portion of data represents the exponent of the floating point number and a second portion of data represents the mantissa of the floating point number. Thereafter, a determination is made whether a portion of the low order bits of the floating point number are zero and, if so, the number is stored in a first format. In the first format, the predetermined portion of the low order bits of the floating point number are truncated and a two bit identifier is added to the number wherein the two bit identifier identifies the number as being stored in the first format. If a predetermined portion of the low order bits of the floating point number are not equal to zero, then a determination is made whether the number can be represented by an integer having a predetermined number of bits. If so, then the number is stored in a second format wherein the step of storing the number in the second format comprises the substep of representing the number as an integer having the predetermined number of bits and providing a second two bit identifier wherein the second two bit identifier identifies the number as being stored in the second format.

In an alternative embodiment of the invention, the floating point number is first multiplied by a predetermined multiplier before determining whether a portion of the low order bits of the floating point number are zero. In a second alternative embodiment of the invention, the number is multiplied by a predetermined multiplier before the determination is made whether the number can be stored as an integer having a predetermined number of bits.

DETAILED DESCRIPTION OF THE INVENTION

Figure 1:
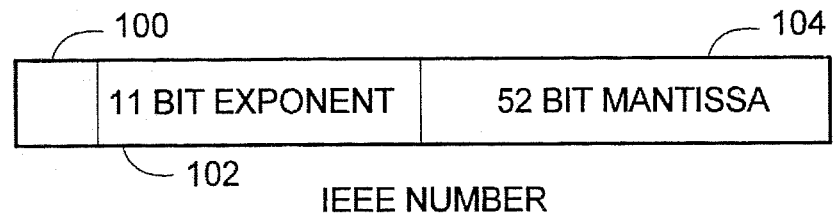
FIG. 1 is a diagram illustrating the bit representation of the IEEE number format.

As discussed above, the subject invention provides a method for storing floating point numbers in a manner to minimize the amount of memory needed. Additionally, the numbers so stored can readily be returned to the IEEE format for use in application programs relying upon the IEEE format. As described above, in the IEEE format (FIG. 1), a first bit 100 is provided as a sign bit. The next eleven bits 102 represent the exponent of the floating point number and the remaining 52 bits 104 represent the mantissa of the floating point number. As is known in the art, the 52-bit mantissa represents only the decimal portion of a standard floating point mantissa. Accordingly, the IEEE number format utilizes 64 bits of storage for each number.

Figure 2A:
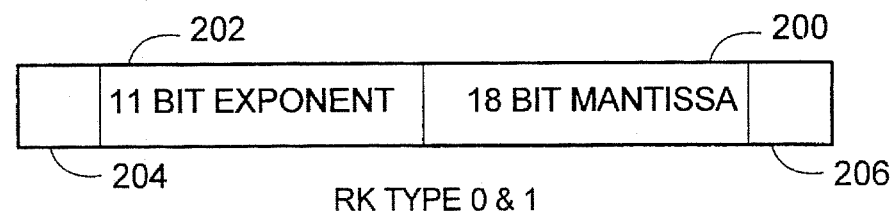
FIG. 2A is a diagram illustrating the bit representation of a floating point number stored in a first encoded format of the subject invention.
Figure 2B:
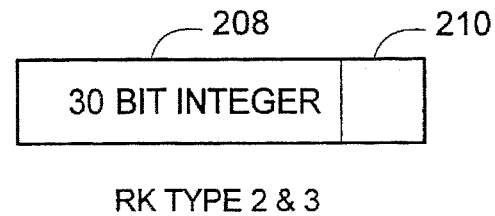
FIG. 2B is a diagram illustrating the bit representation of a floating point number stored in a second encoded format of the subject invention.

In accordance with the method of the subject invention, IEEE numbers are stored in either a first format, as illustrated in FIG. 2A, or a second format, as illustrated in FIG. 2B. Since the typical user of commonly available application software does not commonly use numbers having more than approximately six significant digits, the entire 52-bit mantissa provided in the IEEE standard typically represents wasted storage space. Accordingly, numbers stored in accordance with the first format of the subject invention utilize only an 18-bit mantissa 200 in combination with an 11-bit exponent 202, a sign bit 204, and a two-bit identifier 206. The two-bit identifier is provided to identify the format and encoding of the stored number. As will be described in more detail below, the standard IEEE number can be encoded in two alternative ways to provide a number that can be stored in the first format. These two alternative methods of encoding the IEEE number are referred to herein as "RK Type 0" and "RK Type 1" encoding, as will be discussed in more detail below.

In addition to using numbers having relatively few significant digits, a significant number of users of application software do not require decimal numbers, but instead use a large number of integers. For these users the 11-bit exponent of the IEEE format represents significant storage overhead. Further, these users do not normally require 52 bits to store the integer. Accordingly, numbers stored in the second format of the subject invention provide a 30-bit signed integer 208 in combination with a two-bit identifier 210. As discussed above with reference to the first format of the subject invention, an IEEE number may be encoded in two alternative ways prior to being stored in the second format of the subject invention. These two alternative methods for encoding are referred to herein as "RK Type 2" and "RK Type 3" encoding, as will be discussed in more detail below.

Figure 3:
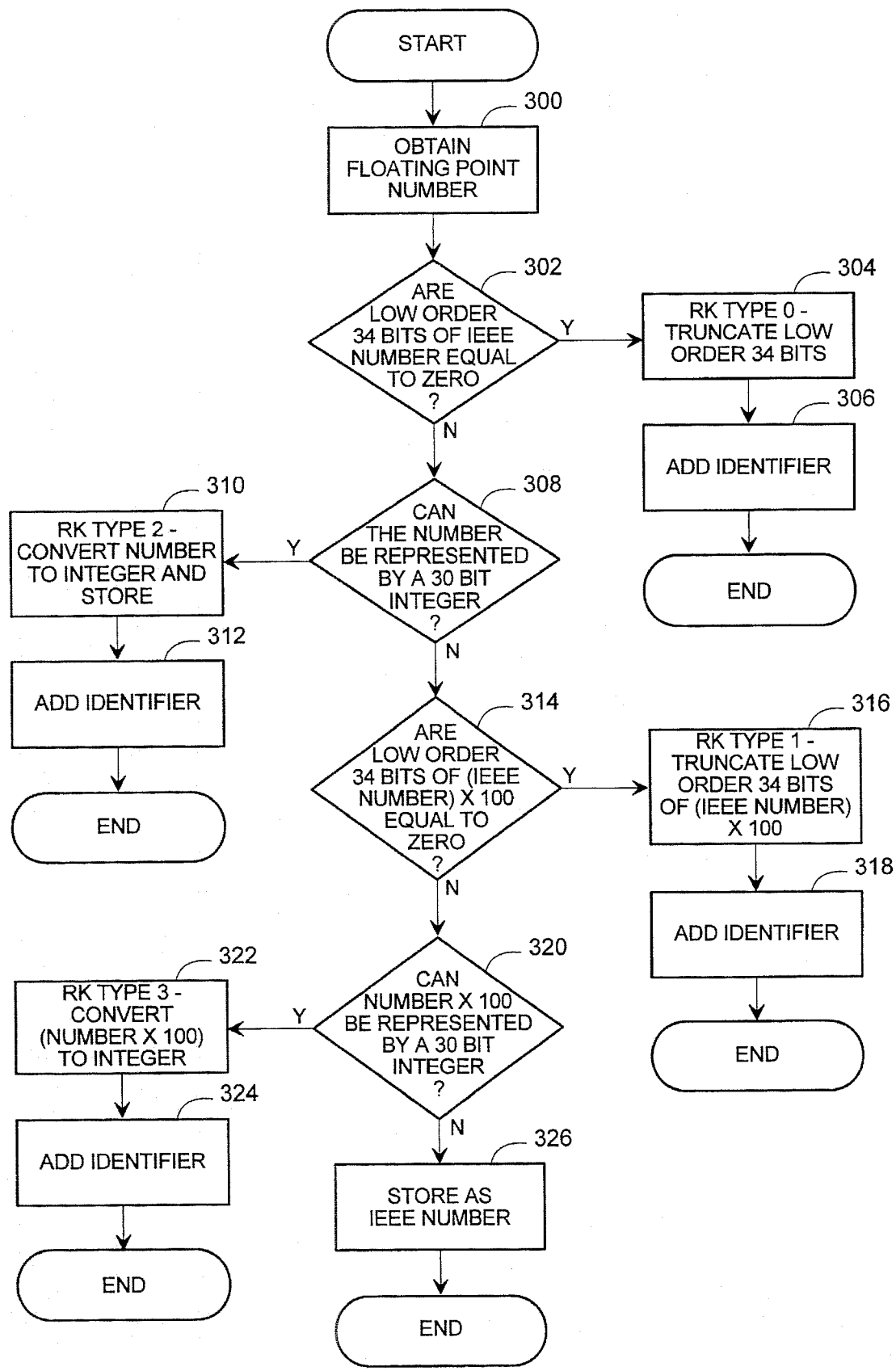
FIG. 3 is a decision flow diagram illustrating the method for encoding floating point numbers in accordance with the subject invention.

One preferred method for encoding floating point numbers in accordance with the subject invention is illustrated in FIG. 3. Therein, the number to be stored is first obtained as a floating point number, step 300. Those skilled in the art will recognize that the number is typically represented as a floating point number by the application software that the user is currently operating. For various reasons, storing numbers in a floating point format is desirable for performing arithmetic operations. Also, use of a standard format is desirable to allow portability of operations between different application software developed by different designers. As such, many of the floating point numbers that are to be stored in accordance with the method of the subject invention will be represented in the standard IEEE format. However, the subject invention is readily applicable to numbers that may be provided in any floating point format.

The IEEE floating point number is then examined to determine whether the low order 34 bits thereof are equal to zero, step 302. If the low order 34 bits are equal to zero, then the number can be stored in the first format simply by truncating the low order 34 bits, step 304, thereby leaving an 18-bit mantissa, as illustrated in FIG. 2A. This method of encoding IEEE floating point numbers is referred to herein as "RK Type 0" encoding. To that end, an identifier is added, step 306, to indicate that the RK Type 0 encoding has been used and the method is terminated until another floating point number is to be stored.

If the low order 34 bits of the IEEE floating point number are not equal to zero, as determined in step 302, then a determination is made as to whether the number can be represented by a 30-bit integer, step 308. In accordance with the subject invention, the determination of step 308 is made by first determining whether the number cannot be represented by a 30-bit integer. This determination is made simply by examining the low order 22 bits of the mantissa of the IEEE floating point number to determine if they are zero and, if they are not, the number cannot be represented as a 30-bit integer. Although this determination is quick, even if the low order 22 bits are equal to zero, the determination does not indicate that the IEEE floating point number can be stored as a 30-bit integer. In that case, the IEEE number must be converted to a decimal number and the decimal number examined to determine if it is an integer having less than 30 bits.

If the IEEE floating point number can be stored as a 30-bit integer, step 308, then the IEEE number is encoded according to RK Type 2 encoding, i.e., the number is converted to an integer and stored, step 310. Thereafter, a two-bit identifier is added to the number to identify it as being encoded according to RK Type 2 encoding, step 312.

If the low order 34 bits of the number are not equal to zero, step 302, and if the number cannot be represented by a 30-bit integer, step 308, then an alternative method is employed to transform the IEEE floating point number into a number wherein either the low order 34 bits of the number are equal to zero or the number can be represented as a 30-bit integer. This method comprises a step of multiplying the IEEE floating point number by a predetermined number. In accordance with the subject invention, the predetermined number is 100. However, those skilled in the art will recognize that many other values can be selected for the predetermined number.

Accordingly, the IEEE floating point number is multiplied by 100, and, thereafter, the multiplied IEEE floating point number is examined to determine whether the low order 34 bits thereof are equal to zero, step 314. If the result of step 314 is affirmative, then the low order 34 bits of the multiplied IEEE number are truncated, step 316, to provide a number stored in accordance with the first format, as illustrated in FIG. 2A. This encoding is referred to as "RK Type 1 encoding" and a two-bit identifier is added to the number, step 318, to indicate RK Type 1 encoding.

If the result of the determination of step 314 is negative, then a determination is made as to whether the number when multiplied by 100 can be represented by a 30-bit integer, step 320. If so, then the number is encoded according to RK Type 3 encoding, i.e., the number times 100 is converted to an integer, step 322. Thereafter, a two-bit identifier is added to the number, step 324, to indicate RK Type 3 encoding.

Those skilled in the art will recognize that steps 314–324 may be repeated for a plurality of multipliers to successively attempt to transform the IEEE number into a number that can be represented in either the first format of FIG. 2A or the second format of FIG. 2B. However, in accordance with the presently preferred embodiment of the invention, if the number cannot be represented in either RK Type 0, RK Type 1, RK Type 2, or RK Type 3 encoding, then the number is stored in the standard IEEE format, step 326 (FIG. 1).

Those skilled in the art will also appreciate that the IEEE number can be readily recreated from the encoded number stored in either the first or second format simply by examining the two-bit identifier to determine what RK type encoding has been employed. Many methods may be readily provided by those skilled in the art for decoding numbers so stored. Further, those skilled in the art will appreciate that the encoding method described hereinabove permits a large quantity of IEEE numbers to be stored in an encoded format that can be readily translated from the IEEE number format to the encoded format. Due to the ease with which the number can be translated, the decrease in speed as seen by the user is negligible. Still further, when stored in either the first or second encoded format, the 64-bit standard IEEE number is reduced to a 30-bit number, thereby representing 50% storage savings. Therefore, the features and benefit to the user of the subject invention can be readily appreciated.

From the foregoing it will be appreciated that, although specified embodiments of the invention have been described herein for purposes of illustration, various modifications may be made without deviating from the spirit and scope of the invention. Accordingly, the invention is not limited except as by the appended claims.

I claim:

1. A method for storing floating point numbers in a computer system, comprising the computer-implemented steps of:

(a) obtaining a number in a standard format wherein a first 11 bits of the number represent an exponent of a floating point number and wherein a last 52 bits of the number represent a mantissa of the floating point number, the number so represented being an IEEE number;

(b) determining whether the low order 34 bits of the IEEE number are zero and, if so, storing the number in a first format and, if not, performing step (c), wherein the step of storing the number in a first format comprises the substeps of truncating the low order 34 bits of the IEEE number to provide a first format number and adding a first two bit identifier that identifies the first format number as an IEEE number stored in the first format;

(c) determining whether the number can be represented by a 30-bit integer and, if so, storing the number in a second format and, if not, performing step (d), wherein the step of storing the number in a second format comprises the substeps of representing the number as a 30-bit integer and adding a second two bit identifier that identifies the second format number as a 30-bit integer stored in the second format;

(d) multiplying the IEEE number by a predetermined multiplier to provide a multiplied IEEE number and determining whether the low order 34 bits of the multiplied IEEE number are zero and, if so, storing the number in the first format and, if not, performing step (e), wherein the step of storing the number in the first format comprises the substeps of truncating the low order 34 bits of the multiplied IEEE number to provide a first format number and adding a third two bit identifier that identifies the first format number as a multiplied IEEE number stored in the first format;

(e) multiplying the number by a predetermined multiplier to provide a multiplied number and determining whether the multiplied number can be represented as a 30-bit integer and, if so, storing the number in the second format and, if not, storing the number as the IEEE number, wherein the step of storing the number in the second format comprises the substeps of representing the multiplied number as a 30-bit integer and adding a fourth two bit identifier that identifies the second format number as a multiplied number stored in the second format.

2. The method as recited in claim 1 wherein step (c), determining whether the number can be represented by a 30-bit integer, comprises the substeps of:

(f) determining whether the number cannot be represented as a 30-bit integer and, if not, performing step (d), otherwise, performing step (g);

(g) determining whether the number can be represented as a 30-bit integer.

3. The method as recited in claim 2 wherein step (f), determining whether the number cannot be represented as a 30-bit integer comprises the substep of determining whether the low order 22 bits of the number are zero and, if not, performing step (d), and if so, performing step (g).

4. The method as recited in claim 2 wherein step (g), determining whether the number can be represented as a 30-bit integer comprises the substeps of converting the number from a floating point number into a representation of a decimal number and determining whether the number is an integer having 30 bits or less.

5. A method for storing numbers in a computer system, comprising the computer-implemented steps of:

(a) obtaining a number as a floating point number wherein a first portion of the number represents an exponent of the floating point number and wherein a second portion of the number represents a mantissa of the floating point number;

(b) determining whether a predetermined portion of the low order bits of the floating point number are zero and, if so, storing the number in a first format and, if not, performing step (c), wherein the step of storing the number in a first format comprises the substeps of truncating the predetermined portion of the low order bits of the floating point number and adding a first two bit identifier that identifies the number as a floating point number stored in the first format;

(c) determining whether the number can be represented by an integer having a predetermined number of bits and, if so, storing the number in a second format and, if not, performing step (d), wherein the step of storing the number in a second format comprises the substeps of representing the number as an integer having the predetermined number of bits and adding a second two bit identifier that identifies the number as an integer stored in the second format;

(d) multiplying the floating point number by a predetermined multiplier to provide a multiplied floating point number and determining whether a predetermined portion of the low order bits of the multiplied floating point number are zero and, if so, storing the number in the first format and, if not, performing step (e), wherein the step of storing the number in the first format comprises the substeps of truncating the predetermined portion of the low order bits of the multiplied floating point number and adding a third two bit identifier that identifies the first format number as a multiplied floating point number stored in the first format; and (e) multiplying the number by a predetermined multiplier to provide a multiplied number and determining whether the multiplied number can be represented as an integer having a predetermined number of bits and, if so, storing the number in the second format and, if not, storing the number as the floating point number, wherein the step of storing the number in the second format comprises the substeps of representing the multiplied number as an integer having the predetermined number of bits and adding a fourth two bit identifier that identifies the second format number as a multiplied number stored in the second format.

6. The method as recited in claim 5 wherein step (c), determining whether the number can be represented by an integer, comprises the substeps of:

(f) determining whether the number cannot be represented as an integer and, if not, performing step (d), otherwise, performing step (g);

(g) determining whether the number can be represented as an integer.

7. The method as recited in claim 6 wherein step (f), determining whether the number cannot be represented as an integer comprises the substep of determining whether the number of bits in the second portion of the number exceeds the predetermined number of bits and, if so, performing step (d), and if not, performing step (f).

8. The method as recited in claim 6 wherein step (g), determining whether the number can be represented as an integer comprises the substeps of converting the number from a floating point number into a representation of a decimal number and determining whether the number is an integer having less bits than the predetermined number of bits.

9. A method for storing numbers in a computer system, comprising the computer-implemented steps of:

(a) obtaining a number as a floating point number having an exponent and a mantissa, the mantissa having a number of bits, the bits being ordered from a high order to a low order, a certain number of the lowest order bits being a portion of the mantissa, the certain number of bits being less than the number of bits in the mantissa;

(b) determining whether the portion of the mantissa is zero and, if so, storing the floating point number in a first format and, if not, performing step (c), wherein the step of storing the floating point number in a first format comprises the substep of truncating the portion of the low order bits of the floating point number;

(c) determining whether the floating point number can be represented by an integer having a predetermined number of bits and, if so, storing the floating point number in a second format wherein file step of storing the floating point number in a second format comprises the substep of representing the floating point number as an integer having the predetermined number of bits.

10. The method as recited in claim 9 wherein step (a), obtaining a number, comprises the substeps of obtaining a number as an intermediate number in a floating point format having an exponent and a mantissa and multiplying the intermediate number by a predetermined value to provide the floating point number.

11. The method as recited in claim 9 wherein step (c), determining whether the floating point number can be represented by an integer, comprises the substep of determining whether the floating point number cannot be represented as an integer.

12. A method for storing numbers in a computer system, comprising the computer-implemented steps of:

(a) obtaining a number as a floating point number wherein a first portion of the number represents an exponent of the floating point number and wherein a second portion of the number represents a mantissa of the floating point number;

(b) multiplying the floating point number by a predetermined multiplier to provide a multiplied floating point number and determining whether a portion of the low order bits of the multiplied floating point number are zero and, if so, storing the number in a first format and, if not, performing step (c), wherein the step of storing the number in a first format comprises the substeps of truncating the portion of the low order bits of the multiplied floating point number and adding a first two bit identifier wherein the first two bit identifier identifies the first format number as being stored in the first format; and (c) multiplying the number by a predetermined multiplier to provide a multiplied number and determining whether the multiplied number can be represented as an integer having a predetermined number of bits and, if so, storing the number in a second format and, if not, storing the number as the floating point number, wherein the step of storing the number in a second format comprises the substeps of representing the multiplied number as an integer having the predetermined number of bits and adding a second two bit identifier wherein the second two bit identifier identifies the second format number as being stored in the second format.

13. A computer system for storing floating point numbers, each floating point number having an exponent and a mantissa, the computer system comprising:

a processor for: (a) receiving a number as a floating point number, the mantissa having a number of bits, the bits being ordered from a high order to a low order, a certain number of the lowest order bits being a portion of the mantissa, the certain number of bits being less than the number of bits in the mantissa, (b) determining whether the portion of the mantissa is zero and, if so, storing the floating point number in a first format by truncating the portion of the low order bits of the floating point number and, if not, (c) determining whether the floating point number can be represented by an integer having a predetermined number of bits and, if so, storing the floating point number in a second format by representing the floating point number as an integer having the predetermined number of bits; and a memory for storing the floating point number in the fist format or the second format.

14. The computer system of claim 13, wherein the processor receives a number as an intermediate number in a floating point format and multiplies the intermediate number by a predetermined value to provide the floating point number.

15. A method for storing floating point numbers in a computer system, comprising the computer-implemented steps of:

(a) obtaining a member in a standard format wherein a first 11 bits of the number represent an exponent of a floating point number and wherein a last 52 bits of the number represent a mantissa of the floating point number, the number so represented being an IEEE number;

(b) determining whether the low order 34 bits of the mantissa of the IEEE number are zero and, if so, storing the number in a first format and, if not, performing step (c), wherein the step of storing the number in a first format comprises the substeps of truncating the low order 34 bits of the IEEE number to provide a first format number and adding a first two bit identifier that identifies the first format number as an IEEE number stored in the first format; and (c) determining whether the number can be represented by a 30-bit integer and, if so, storing the number in a second format and, if not, storing the number in the standard format, wherein the step of storing the number in a second format comprises the substeps of representing the number as a 30-bit integer and adding a second two bit identifier that identifies the second format number as a 30-bit integer stored in the second format.

16. The method as recited in claim 15 wherein step (c), determining whether the number can be represented by a 30-bit integer, comprises the substeps of:

(f) determining whether the number cannot be represented as a 30-bit integer and, if not, performing step (d), otherwise, performing step (g);

(g) determining whether the number can be represented as a 30-bit integer.

17. The method as recited in claim 16 wherein step (f), determining whether the number cannot be represented as a 30-bit integer comprises the substep of determining whether the low order 22 bits of the number are zero and, if not, performing step (d), and if so, performing step (g).

18. The method as recited in claim 16 wherein step (g), determining whether the number can be represented as a 30-bit integer comprises the substeps of convening the number from a floating point number into a representation of a decimal number and determining whether the number is an integer having 30 bits or less.

19. A computer-readable storage device for controlling a computer system to store floating point numbers by performing the steps of:

(a) obtaining a number in a standard format wherein a first 11 bits of the number represent an exponent of a floating point number and wherein a last 52 bits of the number represent a mantissa of the floating point number, the number so represented being an IEEE number;

(b) determining whether the low order 34 bits of the IEEE number are zero and, if so, storing the number in a first format and, if not, performing step (c), wherein the step of storing the number in a first format comprises the substeps of truncating the low order 34 bits of the IEEE number to provide a first format number and adding a first two bit identifier that identifies the first format number as an IEEE number stored in the first format;

(c) determining whether the number can be represented by a 30-bit integer and, if so, storing the number in a second format and, if not, performing step (d), wherein the step of storing the number in a second format comprises the substeps of representing the number as a30-bit integer and adding a second two bit identifier that identifies the second format number as a 30-bit integer stored in the second format;

(d) multiplying the IEEE number by a predetermined multiplier to provide a multiplied IEEE number and determining whether the low order 34 bits of the multiplied IEEE number are zero and, if so, storing the number in the first format and, if not, performing step (e), wherein the step of storing the number in the first format comprises the substeps of truncating the low order 34 bits of the multiplied IEEE number to provide a first format number and adding a third two bit identifier that identifies the first format number as a multiplied IEEE number stored in the first format;

(e) multiplying the number by a predetermined multiplier to provide a multiplied number and determining whether the multiplied number can be represented as a 30-bit integer and, if so, storing the number in the second format and, if not, storing the number as the IEEE number, wherein the step of storing the number in the second format comprises the substeps of representing the multiplied number as a 30-bit integer and adding a fourth two bit identifier that identifies the second format number as a multiplied number stored in the second format.

20. A computer-readable memory device for controlling a computer system to store numbers by performing the steps of:

(a) obtaining a number as a floating point number having an exponent and a mantissa, the mantissa having a number of bits, the bits being ordered from a high order to a low order, a certain number of the lowest order bits being a portion of the mantissa, the certain number of bits being less than the number of bits in the mantissa;

(b) determining whether the portion of the mantissa is zero and, if so, storing the floating point number in a first format and, if not, performing step (c), wherein the step of storing the floating point number in a first format comprises the substep of truncating the portion of the low order bits of the floating point number;

(c) determining whether the floating point number can be represented by an integer having a predetermined number of bits and, if so, storing the floating point number in a second format wherein the step of storing the floating point number in a second format comprises the substep of representing the floating point number as an integer having the predetermined number of bits.

* * * * *

UNITED STATES PATENT AND TRADEMARK OFFICE
CERTIFICATE OF CORRECTION

PATENT NO. : 5,542,068
DATED : July 30, 1996
INVENTOR(S) : Chris Peters

It is certified that error appears in the above-indentified patent and that said Letters Patent is hereby corrected as shown below:

In column 9, claim 18, line 6, please delete "convening" and insert therefor --converting--.

Signed and Sealed this

Third Day of December, 1996

*Attest:*

BRUCE LEHMAN

*Attesting Officer*     *Commissioner of Patents and Trademarks*